(12) United States Patent  
Kashiwakura (10) Patent No.: US 7,124,334 B2  
(45) Date of Patent: Oct. 17, 2006

(54) TEST CIRCUIT AND TEST METHOD FOR COMMUNICATION SYSTEM

(75) Inventor: Shoichiro Kashiwakura, Chiba (JP)

(73) Assignee: Kawasaki Microelectronics, Inc., Chiba (JP)

( * ) Notice: Subject to any disclaimer, the term of this patent is extended or adjusted under 35 U.S.C. 154(b) by 413 days.

(21) Appl. No.: 10/351,489

(22) Filed: Jan. 27, 2003

(65) Prior Publication Data

US 2003/0145259 A1    Jul. 31, 2003

(30) Foreign Application Priority Data

Jan. 30, 2002    (JP)    ............................. 2002-021560

(51) Int. Cl.  
*G01R 31/28* (2006.01)
(52) U.S. Cl. ...................................... 714/712
(58) Field of Classification Search ................ 714/712, 714/715, 716, 717  
See application file for complete search history.

(56) References Cited

U.S. PATENT DOCUMENTS 5,477,364 A * 12/1995 Pearson ........................ 398/54  
5,497,377 A *  3/1996 Muto et al. ................. 714/715  
5,896,213 A *  4/1999 Nagahori et al. ........... 398/100  
6,279,139 B1 *  8/2001 Miyasita ..................... 714/801  
6,871,311 B1 *  3/2005 Watanabe et al. ............ 714/738

* cited by examiner

*Primary Examiner*—James C Kerveros  
(74) *Attorney, Agent, or Firm*—Oliff & Berridge, PLC (57) ABSTRACT

A communication system for transmitting and receiving data at high speed can be self-tested at actual operating speed with low cost, and without increasing the chip area. A test signal generation unit generates test parallel data. A transmitter for test purpose converts the parallel data into serial data. A selector selectively supplies the serial data output from the transmitter to a receiver during a test operation. The receiver converts the serial data into parallel data. After that, a detector detects an error in the parallel data output from the receiver. In this case, only the transmitter is disposed in correspondence with receivers. Serial data output from the transmitters is supplied to the receivers through the selector.

20 Claims, 10 Drawing Sheets

TEST CIRCUIT AND TEST METHOD FOR COMMUNICATION SYSTEM

The disclosure of Japanese Patent Application No. 2002-021560 filed on Jan. 30, 2002, including specification, drawings, and Abstract is incorporated herein by reference in its entirety.

BACKGROUND OF THE INVENTION

1. Field of Invention

The present invention relates to a test circuit and method for a communication system in which serial data is transmitted and received at very high speed.

2. Description of Related Art

A transceiver is an indispensable device for the realization of a high-speed data communication system. The transceiver converts low-speed parallel data into high-speed serial data and then transmits the serial data through a transmission path comprising an optical fiber. Further, the transceiver receives high-speed serial data, detects a point of change in the serial data to generate a recovery clock, and then converts the serial data into low-speed parallel data synchronously with the recovery clock.

Figure 9:
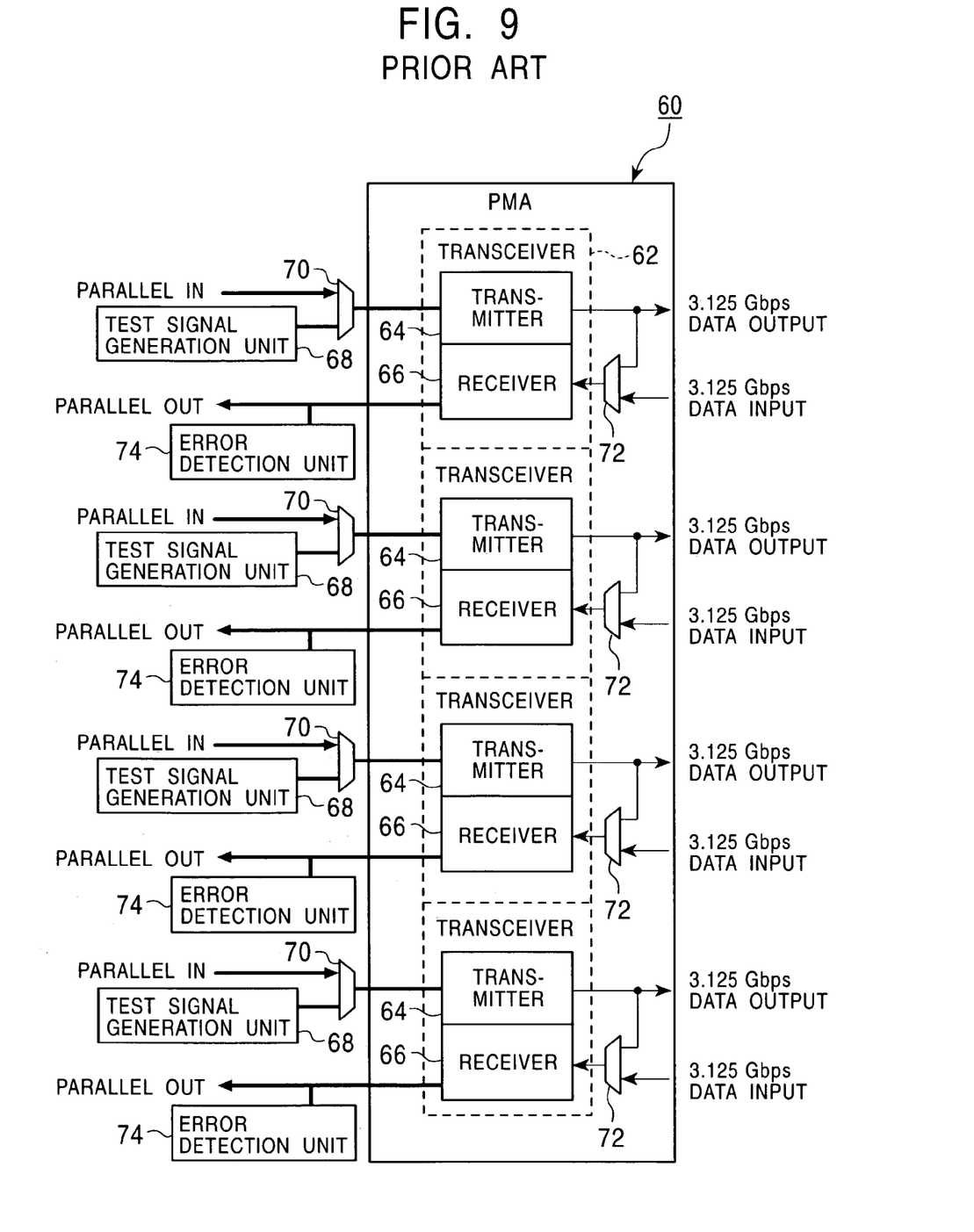
FIG. 9 is a schematic diagram showing an example of the configuration of a 10GBASE-X PMA defined by IEEE P802.3ae.

FIG. 9 is a schematic diagram showing a configuration of an example of 10GBASE-X PMA (Physical Medium Attachment) (PMA) defined by IEEE P802.3ae.

A PMA 60 includes four transceivers 62. Each transceiver 62 comprises a transmitter unit 64 for converting parallel data into serial data and then transmitting the serial data, and a receiver unit 66 for receiving serial data and then converting the received data into parallel data.

In each transceiver 62, the transmitter unit 64 converts 10-bit wide parallel data transmitted at 312.5 Mbps (megabit/second) into 1-bit wide differential serial data to be transmitted at 3.125 Gbps (gigabit/second), and then transmits the converted data (3.125-Gbps data output). The receiver unit 66 receives 1-bit wide differential serial data at 3.125 Gbps (3.125-Gbps data input) and then converts the received data into 10-bit wide parallel data (parallel output) to be transmitted at 312.5 Mbps synchronously with a recovery clock generated based on the serial data.

Testing is the most important challenge in the implementation of the foregoing transceivers 62 on a semiconductor chip. The reason is as follows: an operation performed at actual operating speed cannot be confirmed in a low-speed function test such as a conventional LSI test. Accordingly, whether a semiconductor chip has been produced in normal fashion cannot be confirmed. In addition, a tester capable of handling a data signal transmitted or received at a high speed of 3.125 Gbps is very expensive, resulting in an increase of the test cost.

In designing the transceiver 62, a Built-In-Self-Test (BIST) circuit for performing a self-test, generally called a loopback test, at actual operating speed is built in each transceiver.

With the PMA 60 shown in FIG. 9, a test signal generation unit 68 for generating test parallel data is arranged near a parallel data input of the transmitter unit 64 in each transceiver 62. In the normal operation, parallel data supplied from the outside of the chip is input to the transmitter unit 64 through a multiplexer 70. In the test operation, test parallel data that is generated by the test signal generation unit 68 is input to the transmitter unit 64 through the multiplexer 70. In the transmitter unit 64, the input parallel data is converted into serial data and is then transmitted.

In the normal operation, serial data supplied from the outside of the chip is input to the receiver unit 66 through a multiplexer 72. In the test operation, serial data output from the corresponding transmitter unit 64 is input to the receiver unit 66 through the multiplexer 72. An error detection unit 74 is disposed near a parallel data output of the receiver unit 66. In the test operation, the error detection unit 74 detects an error in the parallel data converted by the receiver unit 66.

In other words, in the test operation, the test signal generation unit 68 generates test parallel data. The transmitter unit 64 converts the test parallel data into serial data and then transmits the data. The receiver unit 66 receives the serial data output from the transmitter unit 64 through the multiplexer 72 and then converts the serial data into parallel data. The error detection unit 74 detects whether the converted parallel data has included an error.

When the BIST circuit is used, the transmitter unit 64 and the receiver unit 66 can be simultaneously tested at the actual operating speed.

Figure 10:
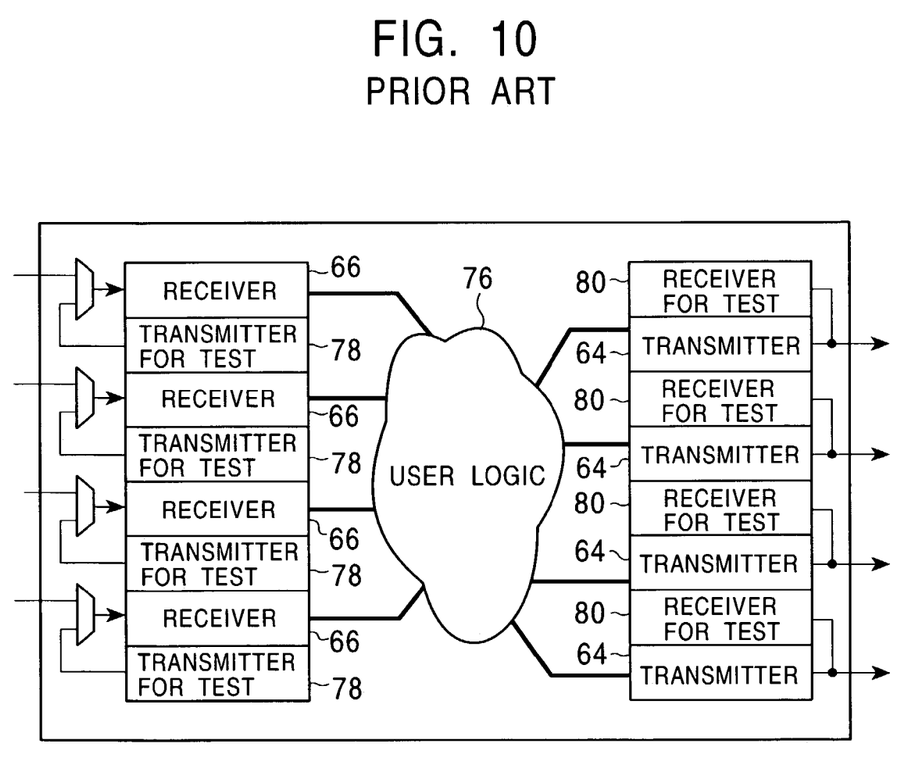
FIG. 10 is a conceptual diagram showing an example of the arrangement of receiver units and transmitter units.

In the implementation of the transceivers 62 on one semiconductor chip, for example, the following arrangement is made in some cases. As shown in FIG. 10, the receiver units 66 are disposed in the left portion of the chip, the transmitter units 64 are arranged in the right portion thereof, and a signal received by each receiver unit 66 is supplied to the corresponding transmitter unit 64 through a user logic 76. The reason is as follows where a system is constructed, for example, having a plurality of chips each including the transceivers 62, the foregoing arrangement with the least waste is obtained in consideration of wiring of data signal lines in board designing.

In order to realize the arrangement shown in FIG. 10, it is necessary to arrange each receiver unit 66 and the corresponding transmitter unit 64 separately from each other. Therefore, when the conventional BIST circuit as shown in FIG. 9 is built in each transceiver, each receiver unit 66 requires a dummy transmitter unit 78 for test purpose and each transmitter unit 64 needs a dummy receiver unit 80 for test purpose. Accordingly, the chip area increases, resulting in an increase in the cost.

SUMMARY OF THE INVENTION

It is an object of the present invention to solve problems of the foregoing related art and to provide a test circuit and method in which a communication system for transmitting and receiving data at high speed can be self-tested at actual operating speed at low cost without increasing the chip area.

To accomplish the above object, according to the present invention, there is provided a test circuit for a communication system that includes a plurality of receivers that receive serial data and then converts the serial data into parallel data. The circuit includes a generator that generates test serial data, and selectors that selectively supply the serial data or the test serial data generated by the generator to a corresponding receiver, wherein the test serial data output from the generator is supplied to the plurality of receivers through the selectors.

Preferably, the generator includes a parallel-to-serial data converter or a transmitter that converts test parallel data into test serial data and then outputs the converted data.

Preferably, the generator further includes a second generator that generates test parallel data to be supplied to the parallel-to-serial data converter or the transmitter.

The test circuit can further include a detector that detects an error in parallel data output from each of the receivers.

Buffers are preferably disposed on a signal line for transmitting serial data generated from the generator, and output signals of the respective buffers are connected to the selectors.

Preferably, flip-flops are arranged on a signal line for transmitting serial data generated from the generator, the flip-flops corresponding to the respective receivers and sequentially shifting serial data output from the generator synchronously with a synchronous clock, and output signals of the respective flip-flops are connected to the selectors.

According to the present invention, there is provided a test circuit for a communication system that includes a plurality of transmitters that convert parallel data into serial data and then transmit the converted data. The circuit includes a first selector that selectively supplies parallel data or test parallel data to a corresponding transmitter, a second selector that selectively outputs one of the serial data outputs of the plurality of transmitters and a detector that detects an error in the serial data output from the second selector.

The detector can include a serial-to-parallel data converter or a receiver that converts serial data output from the second selector into parallel data.

Preferably, the detector further includes a second detector that detects an error in parallel data output from the serial-to-parallel data converter or the receiver.

The test circuit further includes a generator that generates test parallel data and then supplies the data to the transmitters.

The second selector includes third selectors on a signal line for transmitting serial data output from the transmitters, and all of the third selectors are connected so that an output signal of each third selector is supplied to one input terminal of the next third selector, serial data output from the corresponding transmitter is supplied to the other input terminal of each of the third selectors, and an output signal of the last third selector is supplied to the detector.

The second selector can also have third selectors and flip-flops on a signal line for transmitting serial data output from the transmitters, the third selectors corresponding to the respective transmitters except the first transmitter, each flip-flop latching an output signal of the corresponding third selector synchronously with a synchronous clock, and all of the third selectors and the flip-flops are alternately arranged and are connected so that an output signal of the flip-flop is supplied to one input terminal of the subsequent third selector, the serial data output from the corresponding transmitter is supplied to the other input terminal of another third selector, and an output signal of the last flip-flop is supplied to the detector.

According to the present invention, there is provided a test method for a communication system having a plurality of receivers for receiving serial data and then converting the serial data into parallel data, the method includes generating test serial data, and supplying the test serial data to the receivers.

The method can also include converting test parallel data into test serial data, generating test parallel data, detecting an error in parallel data output from each of the receivers, and buffering test serial data and then selecting the test serial data.

According to the present invention, there is provided a test method for a communication system having a plurality of transmitters that convert parallel data into serial data and then transmit the converted data, the method includes selectively supplying parallel data or test parallel data to the corresponding transmitter, selectively outputting one of serial data outputs of the transmitters, and detecting an error in the selectively output serial data.

Preferably, the method further includes generating test parallel data and then supplying the test parallel data to each of the transmitters, and/or converting the selectively output serial data into parallel data and then detecting an error in the parallel data.

DETAILED DESCRIPTION OF PREFERRED EMBODIMENTS

A test circuit and a test method according to the present invention will now be described in detail hereinbelow on the basis of preferred embodiments shown in the appended drawings.

Figure 1:
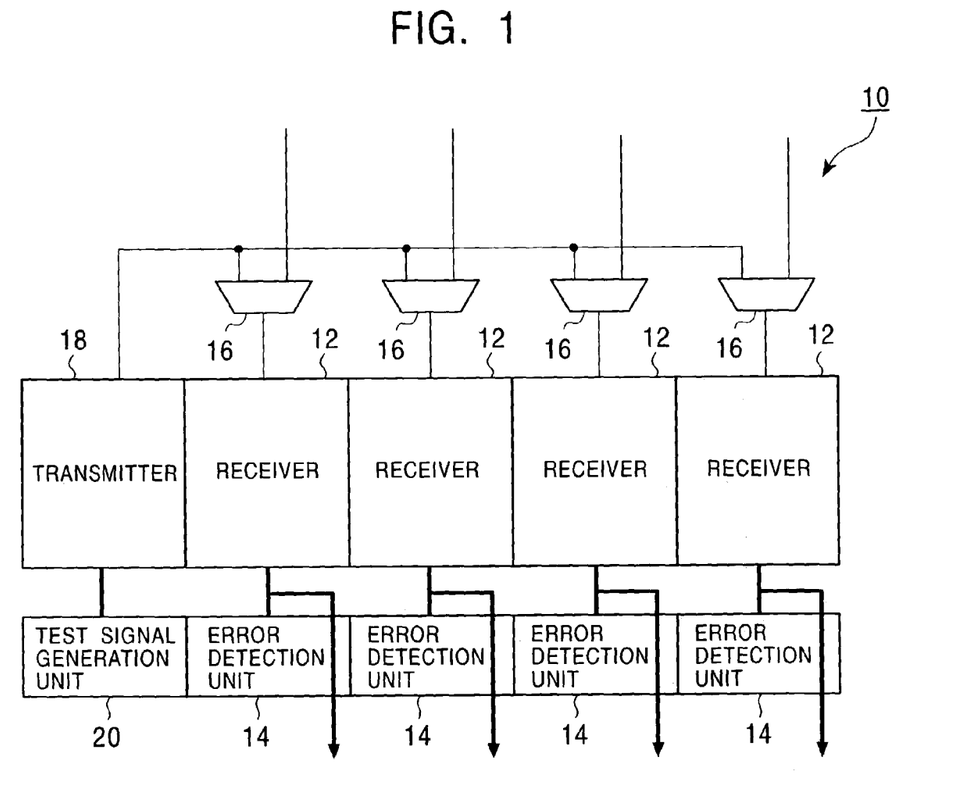
FIG. 1 is an exemplary schematic diagram showing the configuration of a first embodiment of a test circuit according to the present invention.

FIG. 1 is an exemplary schematic diagram of the configuration of a first embodiment of a test circuit according to the present invention.

According to the first embodiment, the present invention is applied to a communication system that includes receiver units to realize a test circuit 10 shown in FIG. 1. The test circuit 10 include four receiver units 12 to be tested, four error detection units 14 corresponding to the respective receiver units 12, four multiplexers (selective supply units) 16 for loopback, a dummy transmitter unit 18 for test purpose, and a test signal generation unit 20.

The dummy transmitter unit 18 and the test signal generation unit 20 correspond to test data generating means according to the present invention and supply test serial data to the respective receiver units 12.

In the test circuit 10, the test signal generation unit 20 is arranged below the dummy transmitter unit 18 in the diagram. The test signal generation unit 20 generates test parallel data. Parallel data output from the test signal generation unit 20 is supplied to the dummy transmitter unit 18.

The dummy transmitter unit 18 is disposed on the left side of the leftmost receiver unit 12 in FIG. 1. The dummy transmitter unit 18 converts parallel data into serial data and then transmits the data. The serial data output from the dummy transmitter unit 18 is supplied to one input terminal of each of the four multiplexers 16. Serial data, which is supplied from, e.g., the outside of a chip in the normal operation, is supplied to the other input terminal of each multiplexer 16.

In response to a test signal (not shown) to switch between a normal operation mode and a test operation mode, in the normal operation mode, each multiplexer 16 selectively outputs serial data supplied from the outside of the chip or an internal circuit. In the test operation mode, the multiplexer 16 selectively outputs serial data supplied from the dummy transmitter unit 18 in response to the test signal. Respective serial data outputs of the four multiplexers 16 are supplied to the corresponding receiver units 12.

Each of the receiver units 12 receives the serial data and then converts the data into parallel data. Referring to FIG. 1, the four receiver units 12 adjoin each other in a line below the corresponding multiplexers 16. The parallel data generated from each receiver unit 12 is supplied to, for example, the internal circuit on the chip and is also supplied to the corresponding error detection unit 14.

Each error detection unit 14 detects whether the parallel data, generated from the corresponding receiver unit 12, has included an error. Referring to FIG. 1, the four error detection units adjoin each other in a line below the corresponding receiver units 12. Each error detection unit 14 compares parallel data generated by, for example, the test signal generation unit 20 with parallel data supplied from the corresponding receiver unit 12 to determine whether both of them are the same, namely, whether the receiver unit 12 functions in the normal fashion at actual operating speed.

In the test circuit 10, in the normal operation mode, serial data outputs from the outside of the chip are supplied to the four receiver units 12 through the corresponding multiplexers 16. Each receiver unit 12 converts the received serial data into parallel data and then supplies the data to the internal circuit on the chip.

In the test operation mode, the transmitter unit 18 converts test parallel data, generated by the test signal generation unit 20, into serial data and then simultaneously supplies the data to the four receiver units 12 through the corresponding multiplexers 16. Each receiver unit 12 converts the input serial data into parallel data and the corresponding error detection unit 14 detects whether the parallel data output from the receiver unit 12 includes an error. The error detection units 14 simultaneously perform the detection.

In the test circuit 10 shown in FIG. 1, the plurality of receiver units 12 can be self-tested using one transmitter unit 18. Accordingly, for example, when the transmitter unit and the receiver units are arranged in separate portions as shown in FIG. 10, many dummy transmitter units corresponding to the respective receiver units are not needed. The chip area can be reduced, thus realizing low cost.

As the transmitter unit 18 shown in FIG. 1, a dummy transmitter unit can be used. Alternatively, one of transmitter units to be actually used in the normal operation mode can also be used. In the case of using a dummy transmitter unit, the dummy transmitter unit having the same configuration as that of a transmitter unit actually used in the normal operation mode can be used. Alternatively, a dummy transmitter unit simplified for test purpose can also be used. For example, so long as a dummy transmitter unit has a function of converting test parallel data generated by the test signal generation unit into serial data, the dummy transmitter unit having any configuration can be used. When the foregoing simplified transmitter unit is used, the chip area can be further reduced.

Furthermore, the test data generating means does not have to be composed of the transmitter unit and the test signal generation unit as shown in FIG. 1. As long as test data generating means generates test serial data to be supplied to each receiver unit, the test data generating means with any configuration can be used.

FIG. 1 shows the case where the four receiver units 12 are arranged. For the number of receiver units 12, two or more receiver units can be disposed. In FIG. 1, the dummy transmitter unit 18 is disposed on the left side of the leftmost receiver unit 12 so as to be adjacent thereto. For example, the dummy transmitter unit 18 can be arranged on the right side of the rightmost receiver unit 12. Alternatively, the dummy transmitter unit 18 can be disposed between the receiver units 12. The arrangement is not limited to any location.

Figure 2:
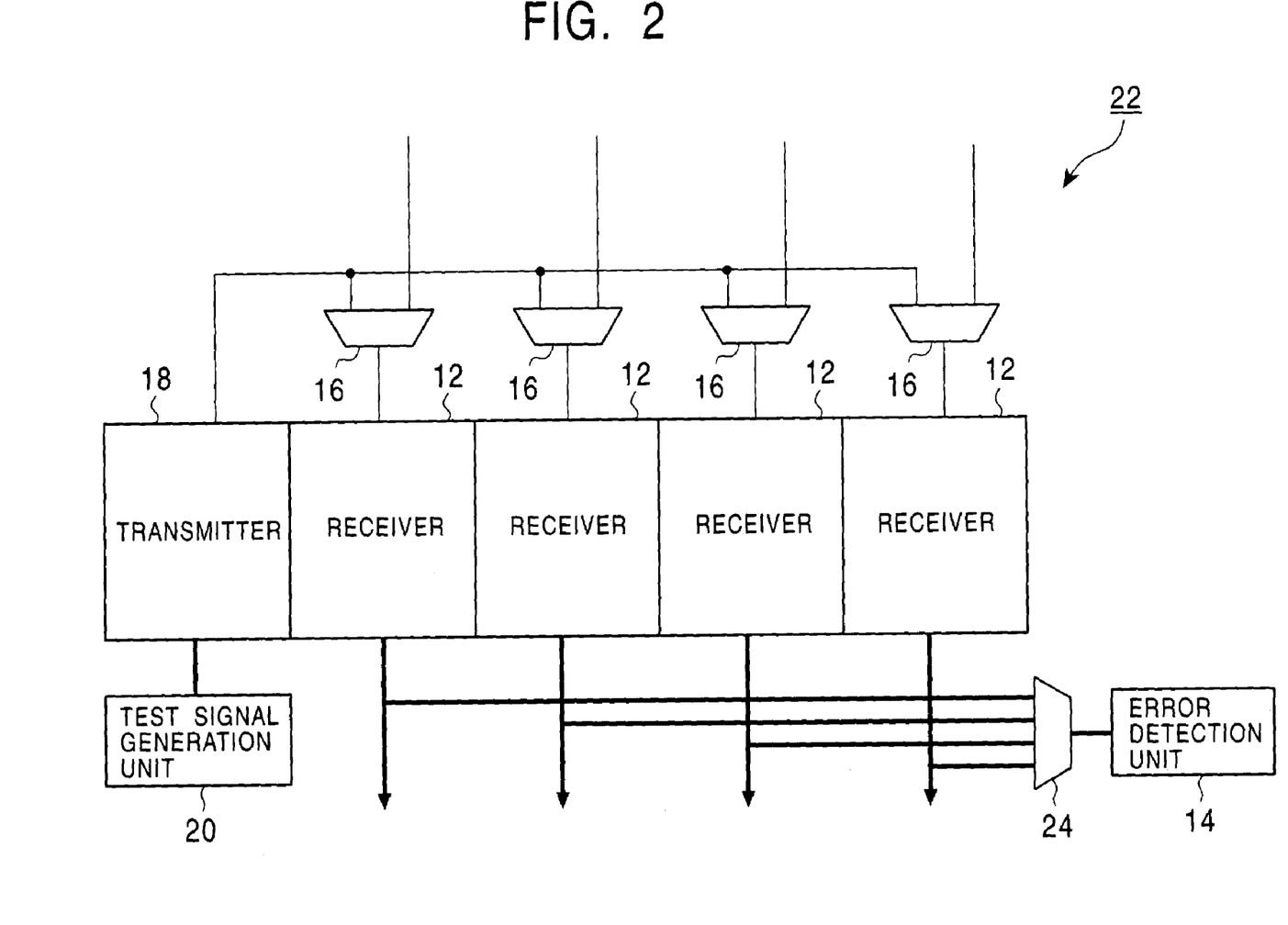
FIG. 2 is an exemplary schematic diagram of a modification of the first embodiment.

In FIG. 1, the four error detection units 14 are arranged so as to correspond to the respective four receiver units 12. The arrangement is also limited to this case. For example, the following arrangement can be realized in a test circuit 22 shown in FIG. 2. Referring to FIG. 2, four parallel data outputs from the four receiver units 12 are supplied to one multiplexer 24 and one parallel data selectively output from the multiplexer 24 is supplied to one error detection unit 14.

In this case, the four receiver units 12 are tested one by one and testing time is four times as long as that in the test circuit 10 shown in FIG. 1. Advantageously, the chip area can be further reduced. Thus, the cost can also be further reduced.

FIG. 2 shows the case where one error detection unit 14 corresponds to the four receiver units 12. The arrangement is not limited to this case. When many receiver units 12 are arranged, the receiver units 12 may be divided into a plurality of groups. One error detection unit 14 can be disposed so as to correspond to each group. In this case, each error detection unit 14 detects an error in parallel data generated from each of the receiver units 12 constituting the corresponding group.

In this instance, when it is assumed that the width in the lateral direction of each receiver unit 12 in FIG. 2 is set to W, the transmitter unit 18 has to drive a loopback signal line having a length of W□n in order to supply serial data to the respective receiver units 12. The signal lines vary from system to system. The signal line may extend to several millimeters. Accordingly, it is extremely difficult to transmit data signals over several millimeters at a very high rate, e.g., 3.125 Gbps while suppressing skew or jitter.

Figure 3:
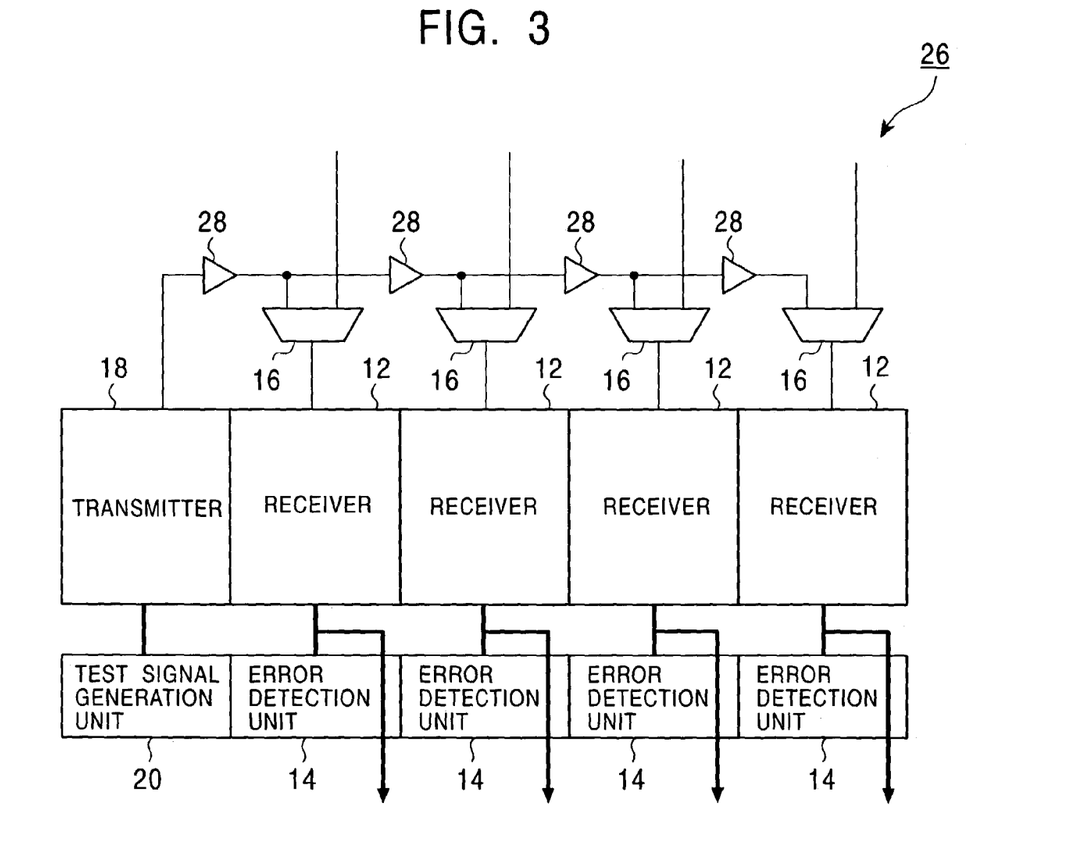
FIG. 3 is an exemplary schematic diagram of another modification of the first embodiment.

Therefore, the following arrangement is preferably used. Referring to FIG. 3, in a test circuit 26, buffers 28 are disposed in series on the signal line for transmitting serial data output from the transmitter unit 18. Thus, the signal line can be driven by amplifying serial data generated from the transmitter unit 18. Therefore, even when many receiver units 12 are arranged, and the signal line is long, serial data can be transmitted with reliability very in a high-speed data communication.

In the test circuit 26 shown in FIG. 3, each buffer 28 is disposed upstream from each multiplexer 16 and all the buffers 28 are connected in series. The arrangement is not limited to this case. For example, when many receiver units 12 are arranged, the receiver units 12 are divided into a plurality of groups. Each buffer 28 can be disposed so as to correspond to each group. The number of receiver units 12 constituting each group can be varied.

A second embodiment of a test circuit according to the present invention will now be described hereinbelow.

Figure 4:
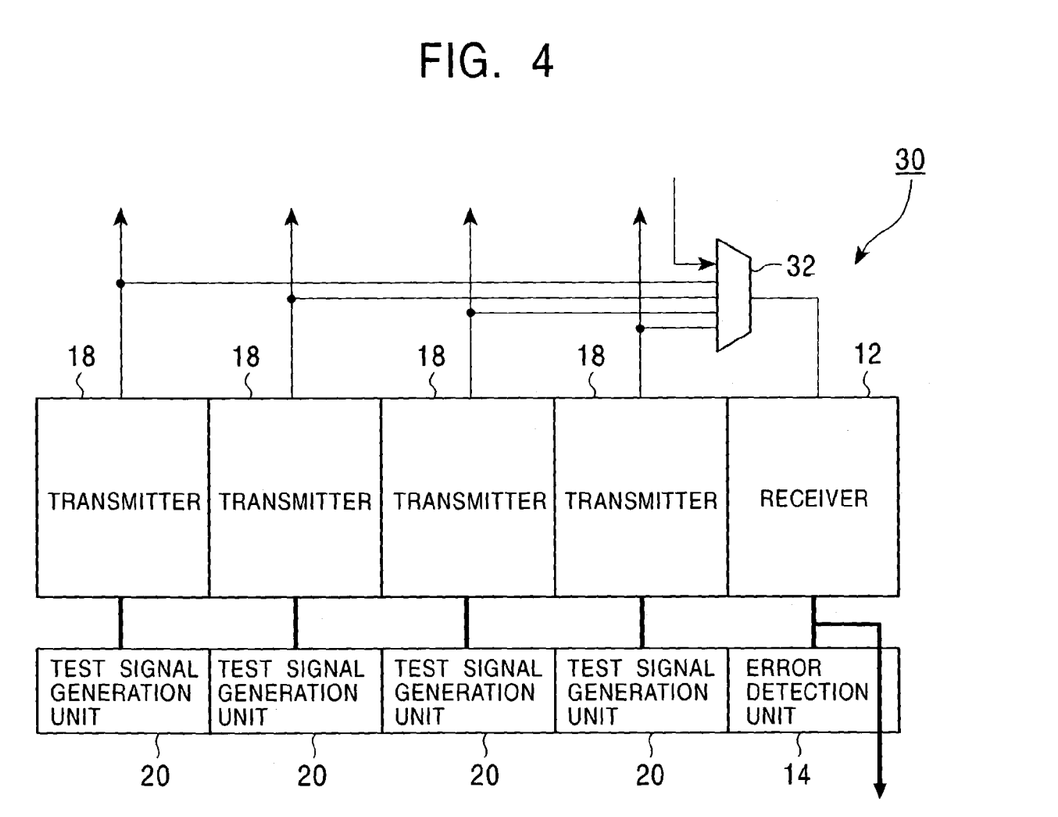
FIG. 4 is an exemplary schematic diagram showing the configuration of a second embodiment of a test circuit according to the present invention.

FIG. 4 is an exemplary schematic diagram of the second embodiment of the present invention.

According to the second embodiment, the present invention is applied to a communication system having transmitter units to realize a test circuit 30 shown in FIG. 4. The test circuit 30 includes four transmitter units 18 to be tested, four test signal generation units 20 corresponding to the respective transmitter units 18, a loopback multiplexer (second selective supply unit) 32, a receiver unit 12 for test purpose, and an error detection unit 14. The receiver unit 12 and the error detection unit 14 correspond to error detecting means according to the present invention and detect an error in serial data supplied from each transmitter unit 18.

In the test circuit 30 shown in FIG. 4, the components except the loopback multiplexer 32, namely, each transmitter unit 18, each test signal generation unit 20, the receiver unit 12, and the error detection unit 14 are the same as those in the test circuit 10 shown in FIG. 1. According to the present embodiment, the receiver unit 12 for test purpose is not dummy. A receiver unit actually used in the normal operation mode is used as the receiver unit 12 for test purpose.

The four test signal generation units 20 are arranged in a line so as to be adjacent to each other. Test parallel data serving as an output signal of each test signal generation unit 20 is supplied to the corresponding transmitter unit 18.

A multiplexer (first selective supply unit) equivalent to, e.g., the multiplexer 70 in FIG. 9 is disposed between each test signal generation unit 20 and the corresponding transmitter unit 18. The multiplexers are omitted in FIG. 4 in order to avoid complexity in the diagram and simplify explanation. In the normal operation mode, each multiplexer selectively outputs parallel data supplied from the outside of a chip. In the test operation mode, the multiplexer selectively outputs parallel data generated from the test signal generation unit 20.

The four transmitter units 18 are disposed in a line so as to be adjacent to each other above the corresponding test signal generation units 20. Serial data that is an output signal of each transmitter unit 18 is supplied to the outside of the chip and is also supplied to an input terminal of the multiplexer 32.

As mentioned above, according to the present embodiment, the receiver unit 12 is actually used as a receiver unit in the normal operation mode. Accordingly, serial data supplied from the outside of the chip in the normal operation mode is also input to the multiplexer 32. When a dummy receiver unit is used as the receiver unit 12, it is unnecessary to input serial data supplied from the outside of the chip into the multiplexer 32 in the normal operation mode.

In the normal operation mode, the multiplexer 32 selectively outputs serial data supplied from the outside of the chip in response to a test signal (not shown) for switching between the normal operation mode and the test operation mode. In the test operation mode, the multiplexer 32 selectively outputs one of four serial data outputs from the four transmitter units 18. The multiplexer 32 supplies serial data to the receiver unit 12.

Parallel data output from the receiver unit 12 is supplied to an internal circuit and is also supplied to the error detection unit 14. In the case of using the dummy receiver unit 12, it is unnecessary to supply parallel data generated from the receiver unit 12 to the internal circuit. Parallel data can be supplied only to the error detection unit 14.

In the test circuit 30 in FIG. 4, in the normal operation mode, four parallel data outputs from the outside of the chip are input to the respective transmitter units 18 through the corresponding multiplexers (not shown). In each transmitter unit 18, the input parallel data is converted into serial data and is then transmitted to the outside of the chip.

In the test operation mode, for example, test parallel data generated by the leftmost test signal generation unit 20 in FIG. 4 is converted into serial data by the corresponding transmitter unit 18. The converted serial data is then supplied to the receiver unit 12 through the multiplexer 32. In the receiver unit 12, the serial data supplied through the multiplexer 32 is converted into parallel data. In the error detection unit 14, whether the parallel data generated from the receiver unit 12 includes an error is detected.

The similar operation is repetitively performed in the order of, for example, the second, third, and fourth transmitter units from the left in FIG. 4.

In the test circuit 30 shown in FIG. 4, the plurality of transmitter units 18 can be self-tested using the only receiver unit 12. Accordingly, even when the transmitter units are arranged separately from the receiver unit as shown in, for example, FIG. 10 many dummy receiver units 12 corresponding to the respective transmitter units 18 are not needed. Thus, the chip area can be reduced, resulting in a reduction in the cost.

As the receiver unit 12 shown in FIG. 4, a dummy receiver unit can be used. Alternatively, one of receiver units, actually used in the normal operation mode, can also be used. When the dummy receiver unit 12 is used, the receiver unit having the same construction as that of the receiver unit that is actually used in the normal operation mode can be used. Alternatively, the receiver unit simplified for test purpose can also be used. For instance, any receiver unit can be used so long as the receiver unit has a function of converting serial data supplied from the transmitter unit into parallel data. It is preferable to use the simplified receiver unit so as to further reduce the chip area.

Furthermore, it is unnecessary that the error detecting means is composed of the receiver unit 12 and the error detection unit 14 shown in FIG. 4. As long as the error detecting means can detect an error in serial data supplied from the transmitter, the means may have any configuration. For example, the error detecting means can detect an error without converting serial data supplied from the transmitter unit into parallel data.

FIG. 4 shows the test circuit including the four transmitter units 18. For the number of transmitter units 18, one or more transmitter units can be used. In this case, the receiver unit 12 is disposed on the right side of the rightmost transmitter unit 18. The receiver unit 12 can also be arranged on, for example, the left side of the leftmost transmitter unit 18. Alternatively, the receiver unit 12 can also be disposed between the transmitter units 18. The arrangement location of the receiver unit 12 is not limited to any location.

In FIG. 4, the four test signal generation units 20 are disposed in correspondence to the four transmitter units 18. The arrangement is not limited to this case. One test signal generation unit 20 can be shared among the four transmitter units 18. In this case, advantageously, the chip area can be further reduced and the cost can also be further reduced.

In the test circuit 30 shown in FIG. 4, when many transmitter units 18 are arranged, the loopback signal line, driven by the leftmost transmitter unit 18 which is arranged the farthest from the loopback multiplexer 32, may extend to several millimeters in the same case as the test circuit 10 shown in FIG. 1.

Figure 5:
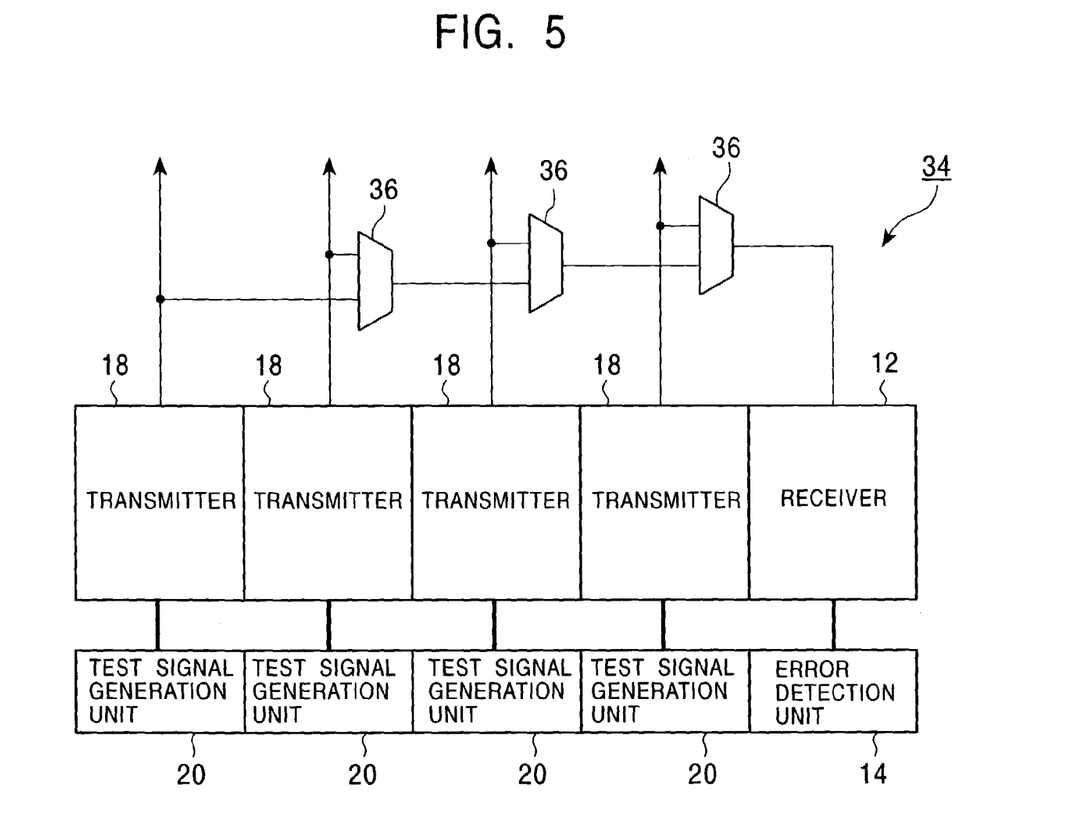
FIG. 5 is an exemplary schematic diagram of a modification of the second embodiment shown in FIG. 4.

A test circuit 34 shown in FIG. 5 is preferably used. In the test circuit 34, multiplexers 36 capable of buffering and outputting signals are disposed in series on a signal line for transmitting serial data generated from the transmitter units 18. Accordingly, the length of the signal line driven by each transmitter unit 18 is reduced and the signal line can be easily driven. Even when many transmitter units 18 are arranged and data communication is performed at very high speed, serial data can be transmitted reliably.

In the test circuit 34 in FIG. 5, the multiplexers 36 are arranged in correspondence with the first to third transmitter units 18 from the right in FIG. 5, respectively, and all the multiplexers 36 are connected in series. The arrangement is not limited to this case. For example, when the number of transmitter units 18 is very large, the transmitter units 18 can be divided into a plurality of groups and one multiplexer 36 can be arranged in correspondence with each group. The number of transmitter units 18 consisting one group can be varied.

A third embodiment of a test circuit according to the present invention will now be described hereinbelow.

Figure 6:
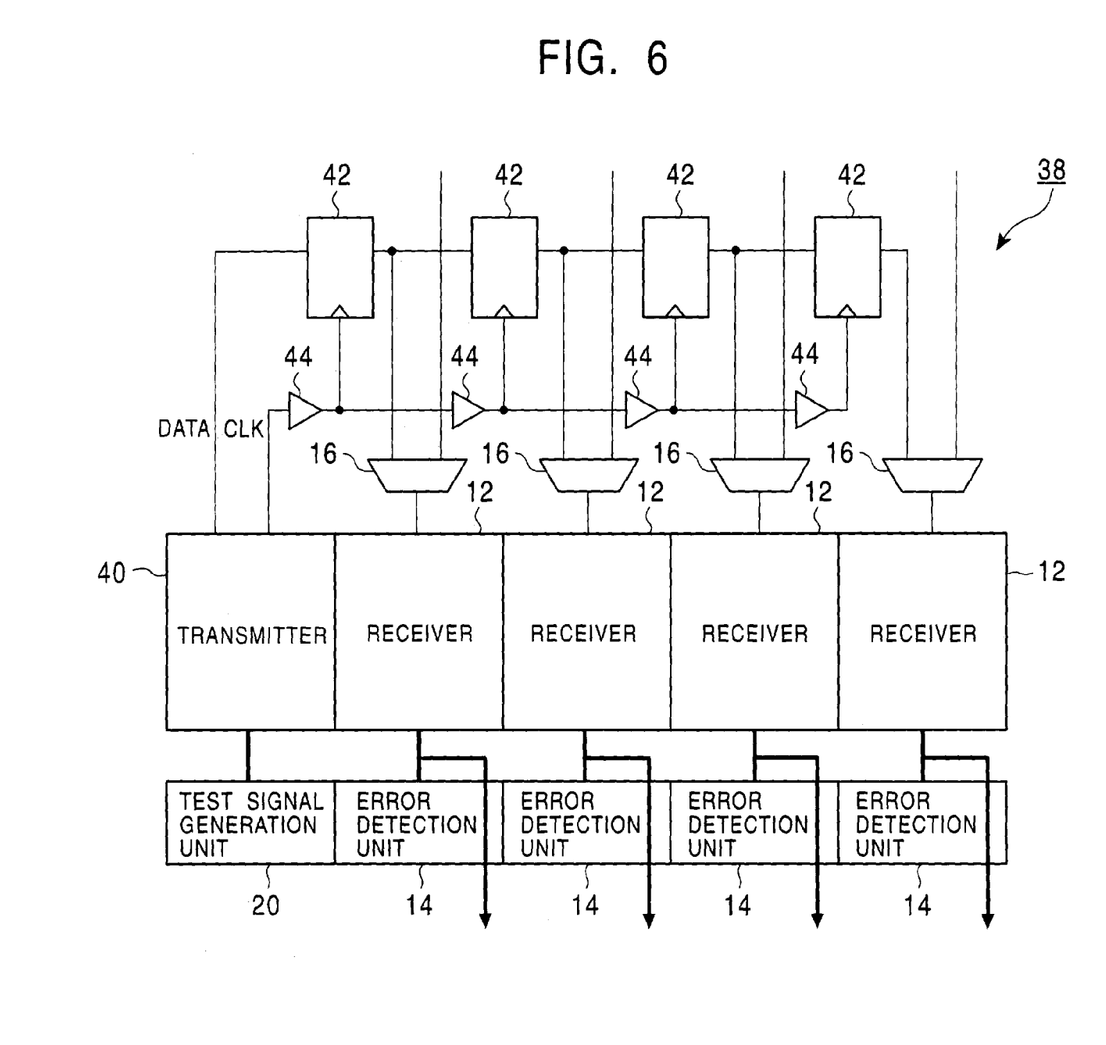
FIG. 6 is an exemplary schematic diagram showing the configuration of a third embodiment of a test circuit according to the present invention.

FIG. 6 is an exemplary schematic diagram of the third embodiment of the present invention.

According to the third embodiment, the present invention is applied to a communication system that includes receiver units to realize a test circuit 38 shown in FIG. 6. The test circuit 38 includes four receiver units 12 to be tested, four error detection units 14, four multiplexers 16, four flip-flops 42, four buffers (selective supply units) 44, a transmitter unit 40 for test purpose, and a test signal generation unit 20. The error detection units 14, the multiplexers 16, the flip-flops 42, and the buffers 44 correspond to the respective receiver units 12. The multiplexers 16, the flip-flops 42, and the buffers 44 are used for loopback.

The transmitter unit 40, used in the test circuit 38 shown in FIG. 6, will now be described hereinbelow.

Figure 8:
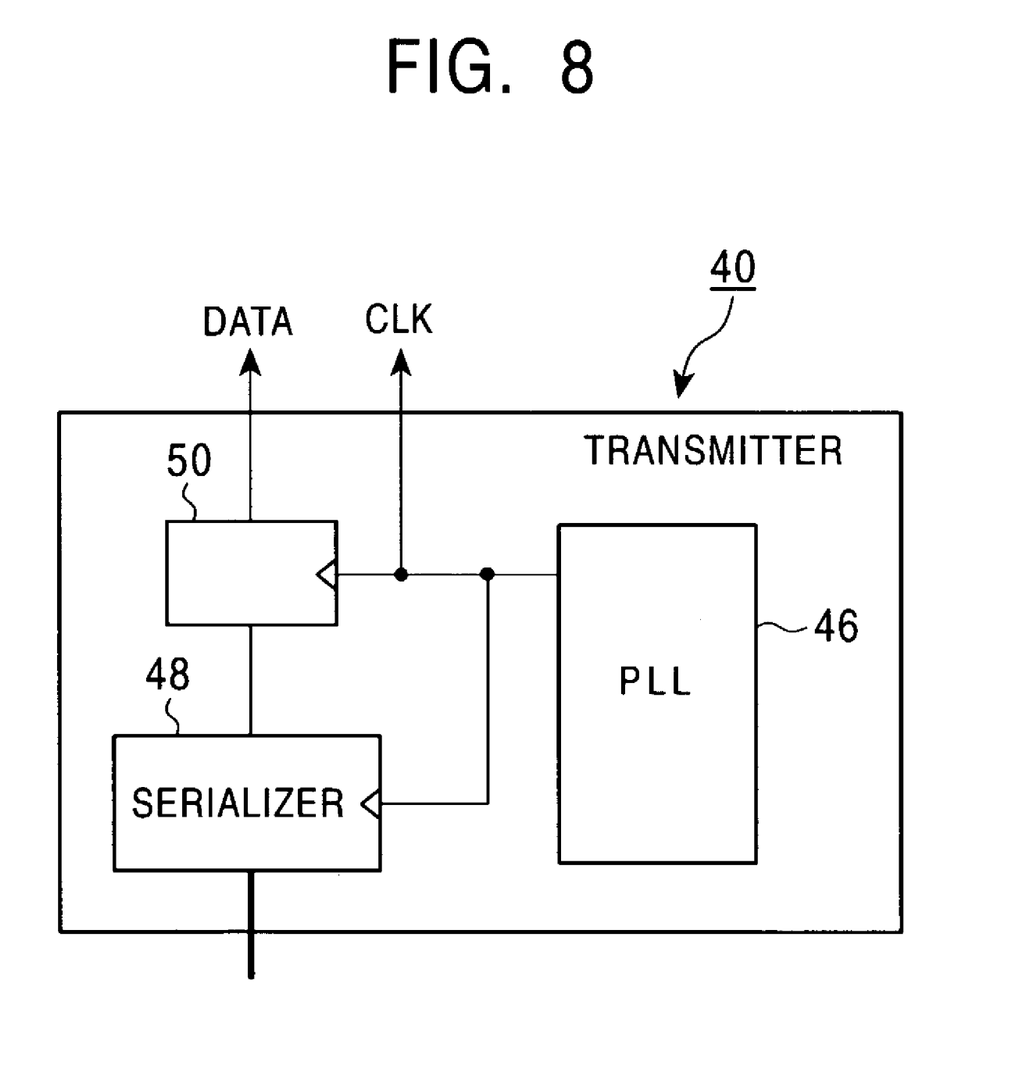
FIG. 8 is an exemplary schematic diagram showing the configuration of a transmitter unit which is used in the test circuits according to the third and fourth embodiments of the present invention.

FIG. 8 is an exemplary schematic diagram showing an example of the configuration of the transmitter unit used in the test circuit 38 shown in FIG. 6 according to the third embodiment of the present invention. Referring to FIG. 8, the transmitter unit 40 includes a PLL (phase-locked loop) circuit 46 for generating a synchronous clock, a serializer 48 for converting parallel data into serial data synchronously with the synchronous clock generated by the PLL circuit 46, and a flip-flop 50 for retiming serial data output from the serializer 48.

In the transmitter unit 40, the PLL circuit 46 generates a synchronous clock and the serializer 48 converts parallel data into serial data synchronously with the synchronous clock. After that, the flip-flop 50 retimes the serial data output from the serializer 48 synchronously with the synchronous clock and then outputs the data as a signal DATA. The PLL circuit 46 also outputs the synchronous clock as a signal CLK.

Referring to FIG. 6, the components of the test circuit 38 except the flip-flops 42 and the buffer 44 for loopback and the above-mentioned transmitter unit 40, namely, the test signal generation unit 20, each receiver unit 12, and each error detection unit 14 are the same as those in the test circuit 10 shown in FIG. 1.

The serial data DATA and the synchronous clock CLK output from the transmitter unit 40 is supplied to the flip-flop 42 and the buffer 44, respectively. The leftmost flip-flop 42 and the leftmost buffer 44 correspond to the leftmost receiver unit 12 in FIG. 6. An output signal of the buffer 44 corresponding to the leftmost receiver unit 12 is supplied to a clock input terminal of the leftmost flip-flop 42. An output signal of the flip-flop 42 is supplied to one input terminal of the leftmost multiplexer 16.

In this manner, an output signal of the flip-flop 42 corresponding to the leftmost receiver unit 12 in FIG. 6 is supplied to the flip-flop 42 corresponding to the second receiver unit 12 from the left, and an output signal of the buffer 44 corresponding to the leftmost receiver unit 12 is supplied to the buffer 44 corresponding to the second receiver unit 12 from the left. An output signal of the buffer corresponding to the second receiver unit 12 from the left is supplied to a clock input terminal of the corresponding flip-flop 42. An output signal of this flip-flop 42 is supplied to one input terminal of the corresponding multiplexer 16.

Each of the flip-flop 42 and the buffer 44 corresponding to the third receiver unit 12 from the left has a configuration similar to the above. An output signal of the flip-flop 42 corresponding to the rightmost receiver unit 12 in FIG. 6 is supplied to one input terminal of the corresponding rightmost multiplexer 16.

The operation of the test circuit 38 shown in FIG. 6 in the normal operation mode is exactly the same as that of the test circuit 10 shown in FIG. 1.

In the test operation mode, the synchronous clock CLK output from the transmitter unit 40 is buffered by each of the buffers 44 corresponding to the respective receiver units 12 and is then transmitted. The serial data DATA output from the transmitter unit 40 is latched by each flip-flop 42 synchronously with the synchronous clock buffered by the corresponding buffer 44. The latched data is retimed and is then output from the flip-flop 42. The data is then shifted by the flip-flop in the next stage.

Accordingly, in the test operation mode, synchronously with the synchronous clock CLK, the serial data DATA output from the transmitter unit 40 is shifted by the flip-flops 42 corresponding to the respective receiver units 12 while being retimed. Therefore, serial data is supplied to each receiver unit at timing which is always stable. Thus, even when many receiver units 12 are arranged, a loopback test can be performed without a timing error.

In the test circuit 38 shown in FIG. 6, one error detection unit 14 can be shared among a plurality of receiver units 12 in the same way as the test circuit 22 in FIG. 2. The buffer 44 for buffering the synchronous clock CLK is used for skew adjustment of the synchronous clock CLK. Accordingly, as shown in FIG. 6, the buffers can be arranged so as to correspond to the respective receiver unit 12. Alternatively, the receiver units can be divided into a plurality of groups and one buffer can be disposed in correspondence with each group. According to the present embodiment, the flip-flops 42 are arranged so as to correspond to the respective receiver units 12. The arrangement is not limited to this case. One flip-flop 42 can be shared among the receiver units 12.

Referring to FIG. 8, the transmitter unit 40 includes the PLL circuit 46 for generating synchronous clocks CLK. The configuration is not limited to this case. For instance, a synchronous clock CLK can be supplied from the outside. The flip-flop 50 can be omitted and an output of the serializer 48 can be directly set as a signal DATA.

A test circuit according to a fourth embodiment of the present invention will now be described. According to the fourth embodiment, a test circuit includes the transmitter unit 40 shown in FIG. 8.

Figure 7:
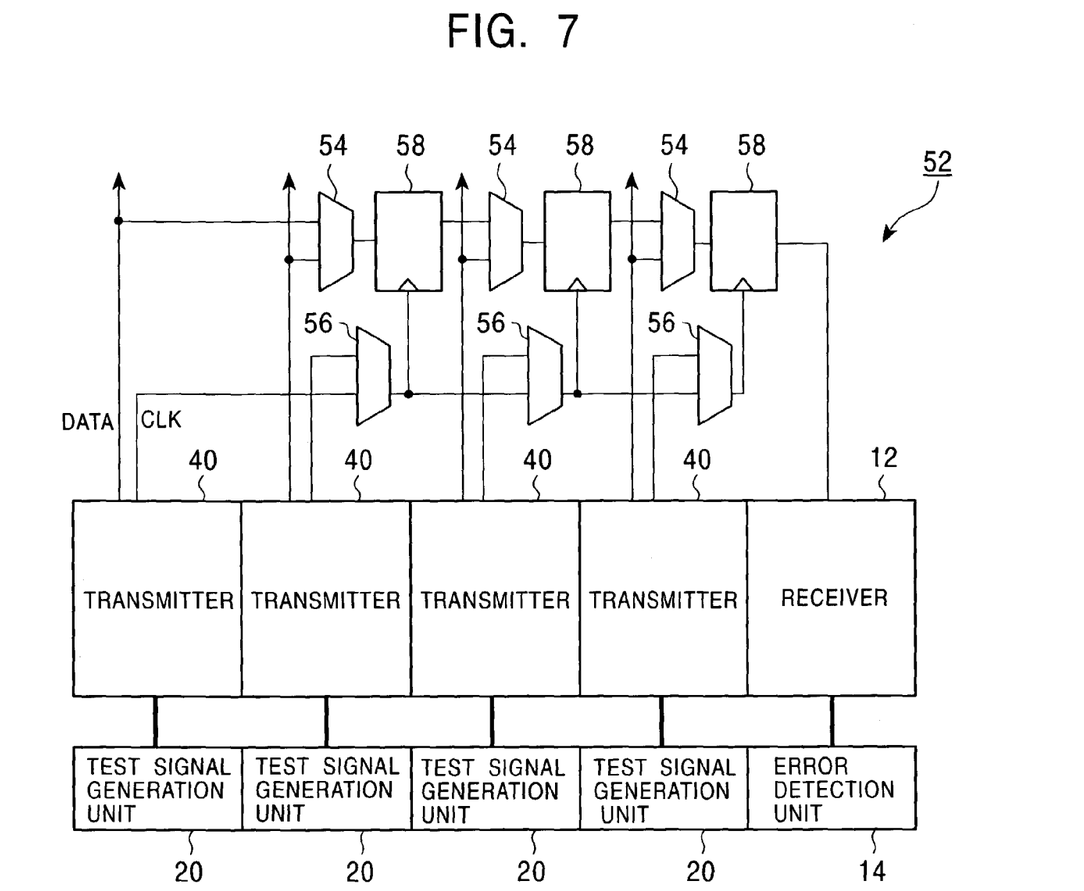
FIG. 7 is an exemplary schematic diagram showing the configuration of a fourth embodiment of a test circuit according to the present invention.

FIG. 7 is an exemplary schematic diagram of the fourth embodiment of the present invention.

According to the present embodiment, the present invention is applied to a communication system including transmitter units to realize a test circuit 52 shown in FIG. 7. The test circuit 52 includes four transmitter units 40 to be tested, four test signal generation units 20, multiplexers 54, multiplexers 56, flip-flops 58, a receiver unit 12 for test purpose, and an error detection unit 14. The multiplexers 54, the multiplexers 56, and the flip-flops 58 are used for loopback and correspond to the first to third transmitter units 40 from the right, respectively.

In FIG. 7, the components of the test circuit 52 except the multiplexers 54, the multiplexers 56, the flip-flops 58, and the transmitter units 40, namely, each test signal generation unit 20, the receiver unit 12, and the error detection unit 14 are the same as those in the test circuit 30 shown in FIG. 4. The components of the transmitter unit 40 are the same as those in FIG. 8.

Serial data DATA output from the leftmost transmitter unit 40 is supplied to one input terminal of the multiplexer 54 corresponding to the second transmitter unit 40 from the left. A synchronous clock CLK output from the leftmost transmitter unit 40 is supplied to one input terminal of the multiplexer 56 corresponding to the second transmitter unit 40 from the left. Serial data output from the second transmitter unit 40 from the left is supplied to the other input terminal of the multiplexer 54 corresponding thereto. A synchronous clock output from the second transmitter unit 40 from the left is supplied to the other input terminal of the multiplexer 56 corresponding thereto. An output signal of the multiplexer 56 corresponding to the second transmitter unit 40 from the left is supplied to a clock input terminal of the corresponding flip-flop 58.

In this manner, an output signal of the flip-flop 58 corresponding to the second transmitter unit 40 from the left is supplied to one input terminal of the multiplexer 54 corresponding to the third transmitter unit 40 from the left. An output signal of the multiplexer 56 corresponding to the second transmitter unit 40 from the left is supplied to one input terminal of the multiplexer 56 corresponding to the third transmitter unit 40 from the left. Serial data output from the third transmitter unit 40 from the left is supplied to the other input terminal of the multiplexer 54 corresponding thereto. A synchronous clock output from the third transmitter unit 40 from the left is supplied to the other input terminal of the multiplexer 56 corresponding thereto. An output signal of the multiplexer 56 corresponding to the third transmitter unit 40 from the left is supplied to a clock input terminal of the corresponding flip-flop 58.

The flip-flop 58, and the multiplexers 54 and 56, corresponding to the fourth transmitter unit 40 from the left, are composed in a manner similar to the above. An output signal of the flip-flop 58 corresponding to the fourth transmitter unit 40 from the left is supplied to the receiver unit 12.

In the normal operation mode, the operation of the test circuit 52 shown in FIG. 7 is exactly the same as that of the test circuit 30 shown in FIG. 4.

In the test operation mode, a synchronous clock CLK output from the leftmost transmitter unit 40 is buffered by each of the multiplexers 56 respectively corresponding to the other transmitter units 40 and is then transmitted. Serial data DATA output from the leftmost transmitter unit 40 is supplied to the flip-flop 58 corresponding to the second transmitter unit 40 from the left through the multiplexer 54 corresponding thereto. This serial data is latched by the flip-flop 58 synchronously with the synchronous clock buffered by the corresponding multiplexer 56. The data is retimed by this flip-flop 58 and is then output. After that, the data is sequentially shifted by the flip-flop in the next stage through the multiplexer in the next stage. Finally, the data is supplied to the receiver unit 12.

Serial data output from each of the second, third, and fourth transmitter units 40 from the left is similarly shifted. Finally, the data is input to the receiver unit 12.

Thus, in the test operation mode, synchronously with the synchronous clock, serial data output from each of the transmitter units 40 is sequentially shifted by each of the flip-flops 58 corresponding to the transmitter units 40 except the leftmost transmitter unit 40 while being retimed. Finally, the data is input to the receiver unit 12. Therefore, data is transmitted at timing which is always stable and is finally supplied to the receiver unit 12. Even when the number of transmitter units 40 is very large, a loopback test can be performed without a timing error.

In the test circuit 52 shown in FIG. 7, one test signal generation unit can be shared among the transmitter units 40. According to the present embodiment, one flip-flop 58 is arranged in correspondence with each transmitter unit 40. The arrangement is not limited to this case. One flip-flop 58 can be shared among the transmitter units 40.

The test circuit according to the present invention can be applied to a communication system having any configuration, for example, a transceiver having only receiver units on a chip, a transceiver having only transmitter units thereon, and a transceiver having receiver units and transmitter units thereon. According to the foregoing embodiments, each test signal generation unit and each error detection unit are built in the chip. The arrangement is not limited to the embodiments. The test signal generation unit and the error detection unit can be arranged on the outside of the chip. In this case, the chip area can be further reduced, resulting in a reduction in the cost.

The present invention is not limited to the foregoing embodiments. Various changes and modifications may be made in the invention without departing from the spirit and scope thereof.

As described above in detail, according to the test circuit and the test method of the present invention, one transmitter unit or one receiver unit for test purpose is arranged in correspondence with a plurality of receiver units or transmitter units to be tested, and the receiver units or transmitter units are self-tested using the transmitter unit or receiver unit for test purpose.

According to the test circuit and the test method of present invention, the only transmitter unit or receiver unit for test purpose is needed. Thus, the chip area concerned with the test circuit can be reduced, resulting in a reduction in the cost.

While the invention has been described with reference to preferred embodiments thereof, it is to be understood that the invention is not limited to the preferred embodiments or constructions. To the contrary, the invention is intended to cover various modifications and equivalent arrangements. In addition, while the various elements of the preferred embodiments are shown in various combinations and configurations, which are exemplary, other combinations and configurations, including more, less or only a single element, are also within the spirit and scope of the invention.

What is claimed is:

1. A test circuit for a communication system that comprises a plurality of receivers that each receive serial data and then convert the serial data into parallel data, the test circuit comprising:

a generator that generates test serial data; and selectors that selectively supply normal serial data or the test serial data generated by the generator to a corresponding receiver, each selector having a corresponding receiver, wherein the generator is the only generator provided for the plurality of receivers, and the test serial data generated from the generator is supplied in common to the plurality of receivers through the selectors.

2. The circuit according to claim 1, wherein the generator includes a parallel-to-serial data converter or a transmitter that converts test parallel data into test serial data, and then outputs the converted data.

3. The circuit according to claim 2, wherein the generator further includes a second generator for generating test parallel data that is supplied to the parallel-to-serial data converter or the transmitter.

4. The circuit according to claim 1, further comprising:

a detector that detects an error in parallel data output from each of the plurality of receivers.

5. The circuit according to claim 1, wherein buffers are disposed on a signal line for transmitting serial data output from the generator, and output signals of the buffers are connected to the selectors.

6. The circuit according to claim 1, wherein flip-flops are arranged on a signal line for transmitting serial data output from the generator, the flip-flops corresponding to the respective receivers and sequentially shifting serial data output from the generator synchronously with a synchronous clock, and output signals of the flip-flops are connected to the selectors.

7. A test circuit for detecting an error in a communication system that comprises a plurality of transmitters that convert parallel data into serial data and then transmit the converted data, the test circuit comprising:

a first selector that selectively supplies normal parallel data or test parallel data to a corresponding transmitter;

a second selector that selectively outputs one of the serial data outputs of the plurality of transmitters; and a detector that detects the error in the serial data output from the second selector, wherein the detector is the only detector provided for the plurality of transmitters.

8. The circuit according to claim 7, wherein the detector includes a serial-to-parallel data converter or a receiver that converts the serial data output from the second selector into parallel data.

9. The circuit according to claim 8, wherein the detector further includes a second detector that detects an error in parallel data output from the serial-to-parallel data converter or the receiver.

10. The circuit according to claim 7, further comprising:

a generator that generates test parallel data and then supplies the data to the transmitters.

11. The circuit according to claim 7, wherein the second selector further comprises third selectors on a signal line for transmitting serial data output from the transmitters, and all of the third selectors are connected so that an output signal of one of the third selectors is supplied to one input terminal of another one of the third selectors, the serial data output from the corresponding transmitter is supplied to another input terminal of another third selector, and an output signal of the last third selector is supplied to the detector.

12. A test circuit for a communication system that comprises a plurality of transmitters that convert parallel data into serial data and then transmit the converted data, the test circuit comprising:

a first selector that selectively supplies parallel data or test parallel data to a corresponding transmitter;

a second selector that selectively outputs one of the serial data outputs of the plurality of transmitters; and a detector that detects an error in the serial data output from the second selector, wherein the second selector has third selectors and flip-flops on a signal line for transmitting the serial data output from the transmitters, the third selectors corresponding to the respective transmitters except the first transmitter, each flip-flop latching an output signal of the corresponding third selector synchronously with a synchronous clock, and all of the third selectors and the flip-flops are alternately arranged and are connected so that an output signal of the flip-flop is supplied to one input terminal of the subsequent third selector, the serial data output from the transmitter is supplied to the other input terminal of the corresponding third selector, and an output signal of the last flip-flop is supplied to the detector.

13. A test method for a communication system that comprises a plurality of receivers that each receive serial data and then convert the serial data into parallel data, the test method comprising:

generating common test serial data for the plurality of the receivers;

selecting normal serial data or the test serial data; and supplying the selected test serial data to the plurality of the receivers in common from only one generator.

14. The method according to claim 13, further comprising:

converting test parallel data into test serial data.

15. The method according to claim 14, further comprising:

generating test parallel data.

16. The method according to claim 13, further comprising:

detecting an error in parallel data output from the receivers.

17. The method according to claim 13, further comprising:

buffering test serial data and then selecting the test serial data.

18. A test method for detecting an error in a communication system that comprises a plurality of transmitters that convert parallel data into serial data, and then transmit the converted data, the test method comprising:

selectively supplying normal parallel data or test parallel data to a corresponding transmitter;

selectively outputting one of the serial data outputs of the transmitters; and detecting with a detector the error in the selectively output serial data corresponding to the test parallel data, by wherein the detector is the only detector provided for the pluralities of transmitters.

19. The method according to claim 18, further comprising:
  generating test parallel data and then supplying the test parallel data to each of the transmitters; and
  converting the selectively generated serial data into parallel data, and then detecting an error in the parallel data.

20. The method according to claim 18, further comprising:
  generating test parallel data and then supplying the test parallel data to each of the transmitters; or
  converting the selectively generated serial data into parallel data, and then detecting an error in the parallel data.

* * * * *